(12) United States Patent
Zuo et al.

(10) Patent No.: US 11,068,715 B1
(45) Date of Patent: Jul. 20, 2021

(54) AUTOMATED DETECTION AND EXTRACTION OF NUTRITION INFORMATION FOR FOOD PRODUCTS

(71) Applicant: Amazon Technologies, Inc., Seattle, WA (US)

(72) Inventors: Zhen Zuo, Bothell, WA (US); Jinmiao Fu, Mercer Island, WA (US); Vikash Pansari, Seattle, WA (US); Yi Sun, Bellevue, WA (US); Phani Harish Wajjala, Seattle, WA (US); Dheepikaa Natarajan, Seattle, WA (US); Xiangdong Qian, Bothell, WA (US); Yikai Ni, Sammamish, WA (US); Jianfeng Lin, Bellevue, WA (US); Nabajyoti Patowary, Seattle, WA (US); Gaurav Dasgupta, Bothell, WA (US); James Stevenson, Everett, WA (US)

(73) Assignee: Amazon Technologies, Inc., Seattle, WA (US)

(*) Notice: Subject to any disclaimer, the term of this patent is extended or adjusted under 35 U.S.C. 154(b) by 97 days.

(21) Appl. No.: 16/294,284

(22) Filed: Mar. 6, 2019

(51) Int. Cl.
*G10L 15/22* (2006.01)
*G06K 9/00* (2006.01)
*G06Q 30/06* (2012.01)
*G06K 9/32* (2006.01)

(52) U.S. Cl.
CPC ......... *G06K 9/00671* (2013.01); *G06K 9/325* (2013.01); *G06Q 30/0627* (2013.01); *G10L 15/22* (2013.01)

(58) Field of Classification Search
CPC .................... G06K 9/00671; G06K 9/325
See application file for complete search history.

(56) References Cited

U.S. PATENT DOCUMENTS

| | | | |
|---|---|---|---|
| 2013/0290036 A1* | 10/2013 | Strange | G06Q 20/3276 705/4 |
| 2016/0063734 A1* | 3/2016 | Divakaran | G06K 9/4642 382/110 |

* cited by examiner

*Primary Examiner* — Tuan H Nguyen
(74) *Attorney, Agent, or Firm* — Eversheds Sutherland (US) LLP

(57) ABSTRACT

Systems, methods, and computer-readable media are disclosed for systems and methods for automated detection and extraction of nutrition information for food products. Example methods may include identifying at least a first image comprising nutritional data, generating a second image including a first portion of the first image, and generating a third image including a second portion of the first image. Some embodiments may include generating a fourth image using the second image, generating a fifth image using the third image, determining, using at least one of the second image and the fourth image, the first text, determining, using at least one of the third image and the fifth image, the second text, and causing at least a portion of the first text and a portion of the second text to be stored in association with a product identifier.

20 Claims, 7 Drawing Sheets

AUTOMATED DETECTION AND EXTRACTION OF NUTRITION INFORMATION FOR FOOD PRODUCTS

BACKGROUND

The Nutrition Labeling and Education Act (NLEA) requires most foods to bear nutrition labeling and requires food labels that bear nutrient content claims and certain health messages to comply with specific requirements. Nutrition facts may be provided with food products, and may include nutritional information that can be used by consumers. For example, nutrition facts may be printed on packaging, boxes, labels, or other portions of food product packaging, and may include facts such as caloric content, fat content, protein content, and so forth. Some nutrition fact labels may include information needed to comply with government regulations. Nutritional information that is provided with food products may be used by consumers to determine, for example, whether to purchase or consume the food product. For example, a consumer might be interested in purchasing a protein bar with more than 10 grams of protein, but less than 100 Kcal calories. It could be tedious for the consumer to look through the images of all the available protein bars to identify the ones that meet the consumer's criteria. To simplify the discovery of such products, automated identification of nutrition facts to build relevant shopping and searching experiences may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
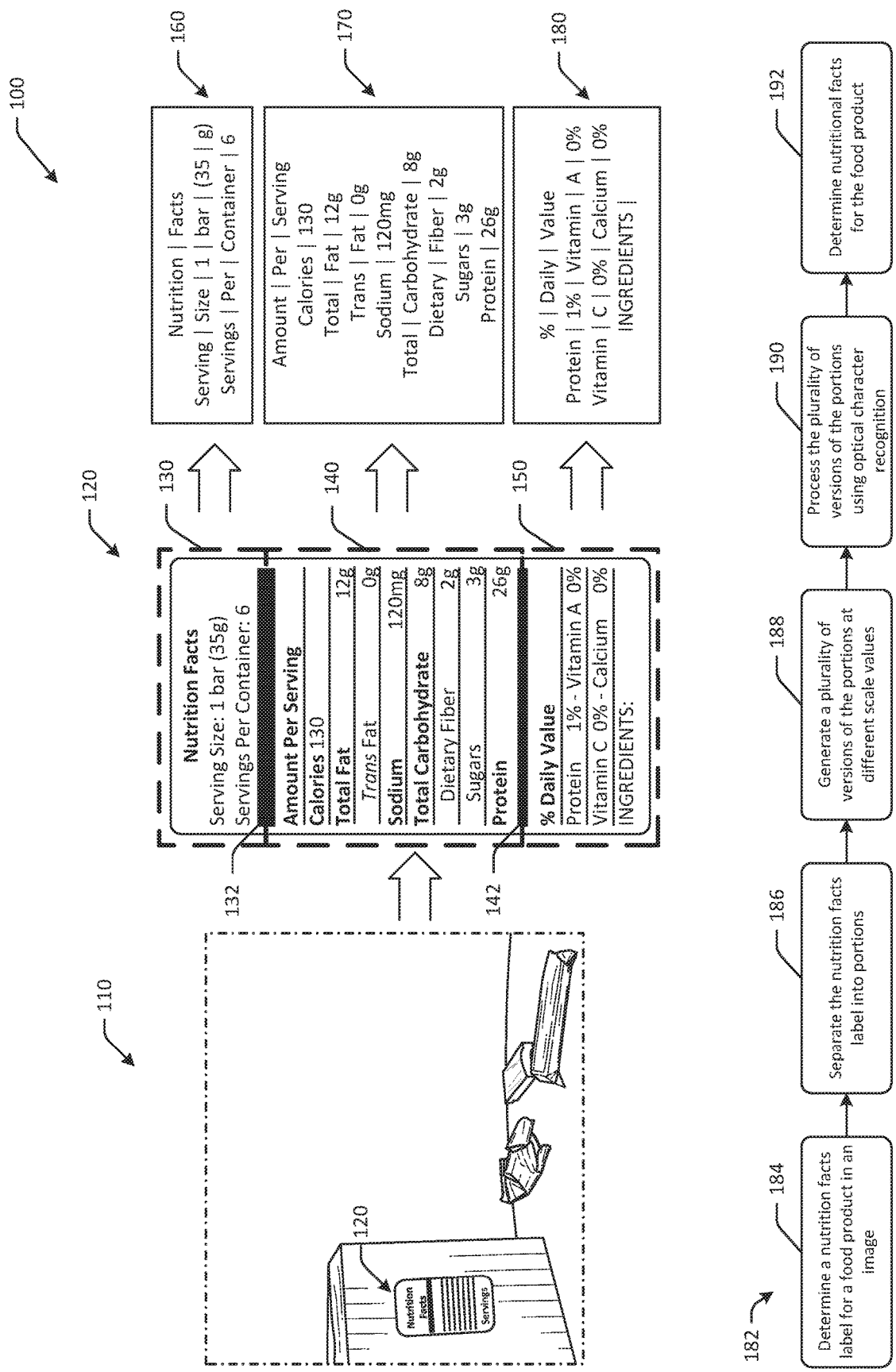
FIG. 1 is a schematic illustration of an example use case for automated detection and extraction of nutrition information for food products and presentation in accordance with one or more example embodiments of the disclosure.

Nutrition information, such as nutrition facts, may be printed on packaging of food products or may otherwise be available to consumers. For example, nutrition facts labels may be presented on food packaging, such as wrappers or boxes. Nutrition information may include information such as caloric information, serving size information, nutrient content information, and so forth. In some instances, nutrition fact labels may be formatted in a certain format to comply with regulations. Consumers may use nutrition information to understand the nutritional value of certain food products. In some instances, consumers may desire to find food products that satisfy certain nutritional requirements, such as foods with low carbohydrate content, high fat content, low caloric content, high nutrient content, and so forth. Accordingly, consumers may desire to search for foods that satisfy desired nutritional attributes.

Nutritional information that is provided with food products may be used by consumers to determine, for example, whether to purchase or consume the food product. In some instances, nutrition information for foods or food products may not be available in a format that can be electronically processed or accessed. For example, although a nutrition facts label may be printed on a bag of chips, the nutrition information may not be searchable in an electronic format or may not otherwise be digitally available. As a result, consumers that are looking for chips having certain nutritional characteristics may have to manually evaluate different types of chips.

Embodiments of the disclosure include systems and methods to automatically detect and extract nutritional information for food products. For example, certain embodiments may use digital content, such as images or videos of food packaging, to determine nutritional information for food products, which can then be associated with the food products to provide searching and/or filtering functionality. Some embodiments may be configured to identify nutrition facts labels in images or videos of food products or packaging, and may be configured to extract and process the nutrition facts labels to determine nutritional information for the food product. The determined nutritional information may be stored in a structured data format in association with a product identifier of the food product. Such structured data may be used to identify food products that correspond to filtering inputs, search queries, and so forth.

To detect and extract nutritional information for food products, in one example, certain embodiments may detect nutrition facts labels in content, such as images or videos of food product packaging, and may extract the nutrition fact label from the content. The extracted nutrition fact label may be separated into discrete images using, for example, one or more line detection or vertical spacing detection algorithms. The discrete images may be processed using optical character recognition algorithms to determine the nutritional information. In some embodiments, the discrete images may be converted to various scale values (e.g., magnified, scaled down, etc.) and individually processed in order to determine a version of the discrete image that is associated with a highest confidence score for optical character recognition output. The resultant nutrition information may be stored in a database in association with a food product identifier.

This disclosure relates to, among other things, devices, systems, methods, computer-readable media, techniques, and methodologies for automated detection and extraction of nutrition information for food products and presentation. Certain embodiments may automatically identify and extract portions of images or videos, separate images into multiple portions, and/or generate versions of the separated portions at different scale values. Certain embodiments may process the images with different scale values using optical character recognition algorithm(s) to determine the nutrition information of the associated food product. Separation of images into multiple portions may be used as nutrition facts label may include unrelated text in the space surrounding the nutritional values, which may reduce accuracy of optical character recognition as a result of increased noise. Generating different versions of discrete portions at different scale values may be used because nutrition facts labels may have variable fonts, font sizes, and/or font types (e.g., bold, italics, etc.), which may reduce accuracy of optical character recognition at a default scale value. Optical character recognition processing results or output may be aggregated across multiple versions of an image (e.g., at different scale values, etc.) to determine results that are most likely to be accurate or are otherwise associated with the highest confidence scores.

Referring to FIG. 1, an example use case 100 for automated detection and extraction of nutrition information for food products is depicted in accordance with one or more example embodiments of the disclosure. In FIG. 1, an image 110 may be associated with a food product. For example, the image 110 may be a marketing image for a granola bar or other food product. The image 110 may include a user consuming the granola bar, with a portion of the granola bar packaging visible in the image. The portion of the granola bar packaging may include a nutrition facts label 120 that is part of the image 110. The image 110 may or may not be a high resolution image, or the nutrition facts label 120 may not be depicted in high resolution. The nutrition facts label 120 may therefore form a part of the image 110. In some instances, images associated with the food product, such as the granola bar, may include an image of the nutrition facts label 120. However, the information presented in the nutrition facts label 120 may not be searchable due to its formatting as an image.

Embodiments of the disclosure may determine that the image 110 associated with the food product includes an image of the nutrition facts label 120. In some embodiments, more than one image associated with the food product may be identified as including an image of the nutrition facts label 120. Identification of the nutrition facts label 120 in an image may be determined using one or more image recognition algorithms, object recognition algorithms, computer vision algorithms, pattern recognition algorithms, and/or any suitable image processing algorithm. The portion of the image 110 that includes the nutrition facts label 120 may be extracted from the image 110. For example, the image 110 may be cropped to remove portions that do not correspond to the nutrition facts label 120.

The extracted nutrition facts label 120 may be separated into multiple portions, so as to form a plurality of images that, when viewed together, form the nutrition facts label 120. For example, the nutrition facts label 120 may be separated into a first image 130 that includes an upper portion of the nutrition facts label 120, a second image 140 that includes a middle portion of the nutrition facts label 120, and a third image 150 that includes a lower portion of the nutrition facts label 120. To determine how many images are to be generated from the nutrition facts label 120, and/or the points at which the nutrition facts label 120 should be separated into different images or portions, certain embodiments may use one or more line detection or gap detection algorithms. For example, nutrition facts label 120 may include horizontal lines having a certain thickness that separate various portions of the nutrition facts label 120. In one example, a first horizontal line may separate a "servings per container" line and an "amount per serving" line, while in another example, a second horizontal line may separate a "protein" line and a "% daily value" line. In some embodiments, vertical spacing or gaps of white space or other non-text space may be used to determine demarcation lines at which the nutrition facts label 120 may be separated. In the example of FIG. 1, the image 110 may be separated into three images corresponding to the upper portion, middle portion, and lower portion of the nutrition facts label 120 using horizontal lines.

The separated images may be processed using a multi-scaling process to generate multiple versions of the respective first image 130, second image 140, and third image 150 at different scale values. For example, a default scale value may be 100%, a first scale value may be 90% (resulting in a smaller image than the default image), a second scale value may be at 110% (resulting in a larger image than the default image), and so forth. Any number of versions (each of which may be discrete images) of each of the first image 130, second image 140, and third image 150 may be generated at various scale values. For example, five versions of the first image may be generated at different scale values. Some or all of the resultant images may be processed using one or more optical character recognition algorithms, so as to identify text in the respective images. Using images at different scale values for optical character recognition processing may result in different confidence scores associated with output of the respective optical character recognition processing. As a result, images that produce the highest confidence scores may be used to determine nutrition information included in the respective image, or portions of optical character recognition processing output may be combined to determine nutrition information with the highest confidence score(s).

For example, the first image 130 may be processed, along with some or all of the versions of the first image 130 at different scale values, using one or more optical character recognition algorithms to determine that the text included in the first image 130 includes the first set of words 160 illustrated in FIG. 1. Similarly, the second image 140 may be processed, along with some or all of the versions of the second image 140 at different scale values, using one or more optical character recognition algorithms to determine that the text included in the second image 140 includes the second set of words 170 illustrated in FIG. 1. The third image 150 may be processed, along with some or all of the versions of the third image 150 at different scale values, using one or more optical character recognition algorithms to determine that the text included in the third image 150 includes the third set of words 180 illustrated in FIG. 1.

As a result, certain embodiments may therefore determine, using the respective sets of words determined from the various images, that the serving size is 1 bar, each serving has 130 calories, 12 grams of fat, 120 mg of sodium, 8 grams of carbohydrates, 2 grams of dietary fiber, 3 grams of sugar, 26 grams of protein, and so forth. The determined nutritional information may be stored in association with an identifier of the granola bar, such as a barcode identifier, a product name identifier, a product identification identifier, and/or another product identifier. Using the stored data, users may be able to search for products that have certain nutritional attributes, and/or determine nutritional information for a particular food. For example, if a user makes a verbal query to a voice assistant (e.g., at a mobile device or a voice assistant device, etc.) of "how many grams of protein are in [the granola bar illustrated in FIG. 1]?," the voice assistant device may determine, using the stored data, that the granola bar includes 26 grams of protein per serving, and may audibly present the answer.

To automatically detect and extract nutrition information for food products, an example process flow 182 is presented and may be performed, for example, by one or more remote servers. The remote server or other computer system may include at least one memory that stores computer-executable instructions and at least one processor configured to access the at least one memory and execute the computer-executable instructions to perform various actions or operations, such as one or more of the operations in the process flow 182 of FIG. 1.

At a first block 184, the remote server may determine a nutrition facts label for a food product in an image. For example, the remote server may determine or otherwise identify a set of images of a food product that is associated with a product identifier of the food product. The remote server may determine that an image in the set of images includes nutritional data, such as the nutrition facts label 120, for example, using an object detection algorithm, an image recognition algorithm, or the like. The image may be an image of a package of a food product, such as the image 110. The remote server may determine a portion of the image that includes the nutritional data, and may extract the portion of the image corresponding to the nutritional data. The nutritional data may be a nutrition facts label that includes serving size information, caloric information, nutrient information, and/or other information. The remote server may extract the portion of the image corresponding to the nutrition facts label.

At a second block 186, the remote server may separate the nutrition facts label into portions. For example, the remote server may process the image of the nutrition facts label using a line detection algorithm and may determine that the image is to be separated into three discrete images. The remote server may therefore generate a first image that includes only a top portion (or upper portion) of the image with first text having a default font size. The remote server may generate a second image that includes only a middle portion of the image with second text having the default font size. The remote server may generate a third image that includes only a bottom portion (or lower portion) of the image with third text having the default font size.

At a third block 188, the remote server may generate a plurality of versions of the portions of images at different scale values. For example, the remote server may generate two or more versions of the portions of images at different scale values. For example, for the image of the upper portion, the remote server may generate an image that includes the first text at a first font size that is greater than the default font size, and another image that includes the first text at a second font size that is less than the default font size. The remote server may similarly generate an image that includes the second text at the first font size, and another image that includes the second text at the second font size. The remote server may generate an image that includes the third text at the first font size, and another image that includes the third text at the second font size.

At a fourth block 190, the remote server may process the plurality of versions of the portions using optical character recognition. For example, the remote server may determine optical character recognition output for one or more, or all, of the different scaled versions of the respective images corresponding to the top, middle, and bottom portions of the image of the nutrition facts label. The resultant optical character recognition output for each version of each image may be associated with a number of confidence scores representing a likelihood that a word or other text detected by the optical character recognition processing is correct. For example, for each word, or for an image as a whole, a confidence score of 90 may indicate that the detected text is 90% likely to be accurate. Some embodiments may include confidence scores for individual characters, individual words, and/or images as a whole.

At a fifth block 192, the remote server may determine nutritional facts for the food product. For example, using the conversion confidence scores, the text included in the image may be determined. For example, the optical character recognition output associated with the highest confidence score(s) (or conversion confidence score(s)) may be selected as the correct text. As a result, the most accurate information may be used for the nutritional information.

In some embodiments, in addition to, or instead of, using conversion confidence scores, presence of certain keywords may be used to determine which optical character recognition output to use as the nutritional information for storage. For example, the remote server may deter that a keyword of "serving size" is present in first optical character recognition output, and may therefore determine that the first optical character recognition output corresponds to the serving size information. In some embodiments, if the keyword appears in more than one optical character recognition output, additional factors, such as conversion confidence scores, may be used to select words or images to use. In another example, the remote server may determine that the word calories is present in second optical character recognition output, and may therefore determine that the second optical character recognition output corresponds to the caloric information. The remote server may determine that the word vitamin is present in third optical character recognition output, and may therefore determine that the third optical character recognition output corresponds to nutrient information.

In some embodiments, certain words or characters may be extracted from various optical character recognition outputs (corresponding to different images and/or versions of images) to construct aggregate nutrition information that has the highest combined confidence score(s). For example, if certain words have a higher confidence score in one image than in another image, and vice versa, the respective words may be extracted from the images and combined, so as to construct aggregate nutrition information using multiple optical character recognition outputs.

Using the optical character recognition output from the images, values for the food product such as a serving size value, a calorie content per serving value, a protein content per serving value, a carbohydrate content per serving value, and/or other values may be determined and stored in association with a food product identifier of the food product. The data may be structured and searchable.

As a result, users may be able to determine nutritional information for certain products, and may also search and/or identify food products that satisfy desired criteria without having to interact with images or nutrition facts labels.

Example embodiments of the disclosure provide a number of technical features or technical effects. For example, in accordance with example embodiments of the disclosure, certain embodiments of the disclosure may automatically analyze video, images, and/or text components of content. Certain embodiments may recognize or identify presence of certain objects and/or images, such as nutrition facts labels, in content and may use one or more machine learning modules or algorithms. As a result of improved functionality, nutrition information may be detected and stored as structured data in associated with food product identifiers. Embodiments of the disclosure may improve computing efficiency and bandwidth by reducing a number of images that may need to be loaded in order to determine nutritional information of a food product. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
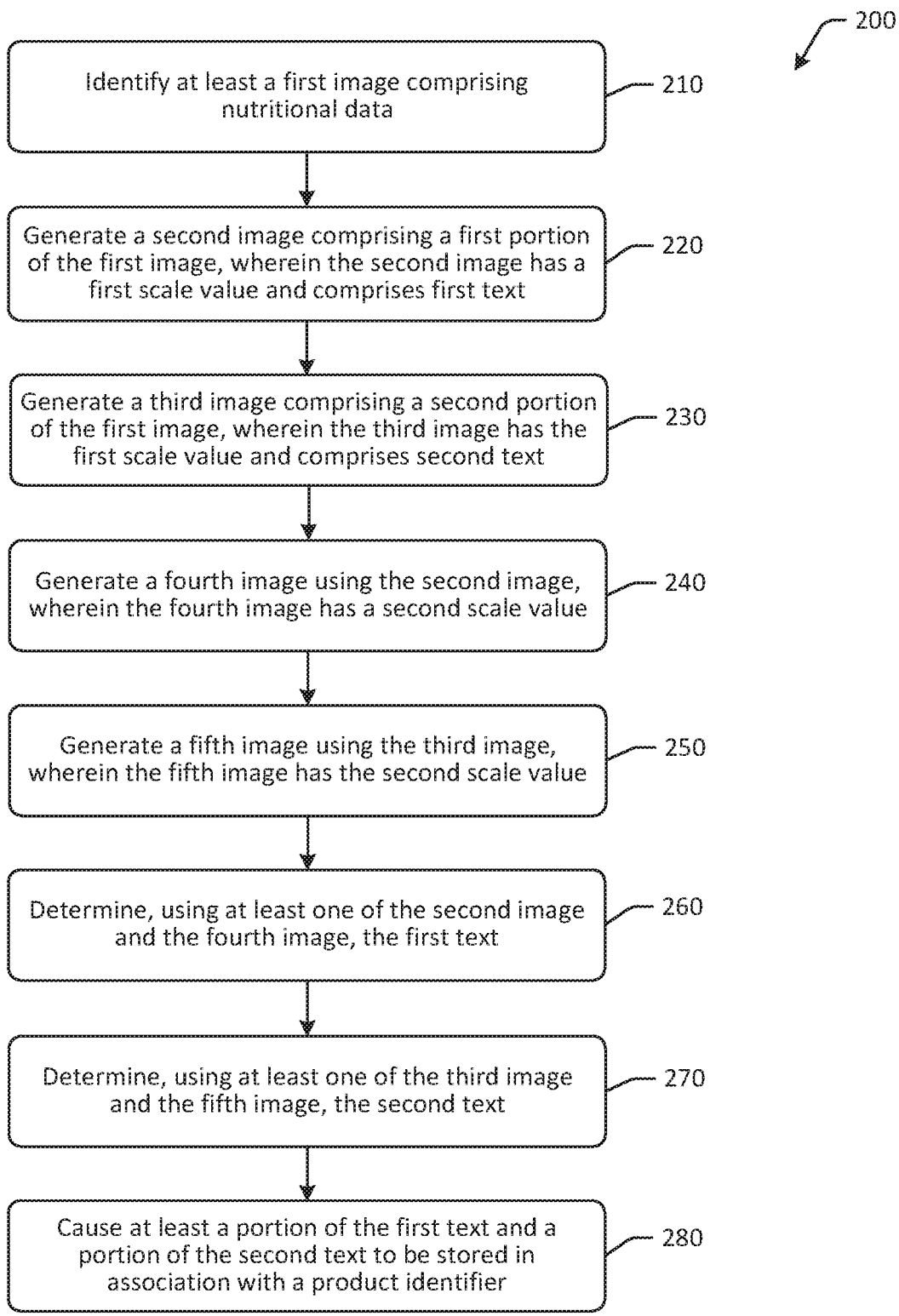
FIG. 2 is a schematic illustration of an example process flow for automated detection and extraction of nutrition information for food products in accordance with one or more example embodiments of the disclosure.

FIG. 2 depicts an example process flow 200 for automated detection and extraction of nutrition information for food products in accordance with one or more example embodiments of the disclosure. While example embodiments of the disclosure may be described in the context of nutritional information, it should be appreciated that the disclosure is more broadly applicable to any type of textual content, such as textual content in images or videos. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a user device, may be executed to identify a first image comprising nutritional data. For example, one or more nutrition text detection engines/modules at a remote server may identify a first image comprising nutritional data. The remote server may determine a set of images, and may process the images using one or more image recognition, pattern recognition, object detection, or other suitable algorithms to detect the presence of nutritional data in an image. For example, the remote server may determine that a nutrition facts label is present in the first image. The remote server may determine a product identifier, such as a food product identifier, associated with the first image. In some instances, the first image may include an image of a food package, while in other instances, the first image may be an image of a nutrition facts label.

At block 220 of the process flow 200, computer-executable instructions stored on a memory of a device, such as a remote server or a user device, may be executed to generate a second image comprising a first portion of the first image, wherein the second image has a first scale value and comprises first text. For example, one or more multi-patch engines/modules at a remote server may generate a second image comprising a first portion of the first image, wherein the second image has a first scale value and comprises first text. The remote server may determine the first portion of the first image, and may extract the first portion to generate the second image. To determine the first portion, the remote server may use one or more line detection (e.g., lines having a certain orientation and/or thickness, etc.) or vertical spacing/gap detection algorithms, for example. The first portion may correspond to a section of the nutritional data in the first image. For example, the remote server may extract a portion of the first image corresponding to an upper portion of a nutrition facts label to generate the second image. The second image may therefore be a section or part of the first image. In some embodiments, the second image may include some, but not all, of the first image. The second image may have a first scale value, such as a default scale value (e.g., 100% scale, etc.). The second image may include first text, such as text representing a portion of the nutritional data.

At block 230 of the process flow 200, computer-executable instructions stored on a memory of a device, such as a remote server or a user device, may be executed to generate a third image comprising a second portion of the first image, wherein the third image has the first scale value and comprises second text. For example, one or more multi-patch engines/modules at a remote server may generate a third image comprising a second portion of the first image, wherein the third image has the first scale value and comprises second text. To determine the second portion, the remote server may use one or more line detection (e.g., lines having a certain orientation and/or thickness, etc.) or vertical spacing/gap detection algorithms, for example. The second portion may be adjacent to the first portion. For example, if the first portion captured in the second image corresponds to an upper portion of a nutrition facts label, the second portion captured in the third image may correspond to a middle portion of the nutrition facts label. Content captured in the second image and third image may be mutually exclusive in some embodiments. In other embodiments, there may be some overlap between the content, such as text, captured in the second image and the third image. The second portion may correspond to a section of the nutritional data in the first image. For example, the remote server may extract a portion of the first image corresponding to a middle portion of a nutrition facts label to generate the third image. The third image may therefore be a section or part of the first image. In some embodiments, the third image may include some, but not all, of the first image. The third image may have the first scale value, such as the default scale value (e.g., 100% scale, etc.). The second image may include second text, such as text representing a portion of the nutritional data.

At block 240 of the process flow 200, computer-executable instructions stored on a memory of a device, such as a remote server or a user device, may be executed to generate a fourth image using the second image, wherein the fourth image has a second scale value. For example, one or more multi-scaling engines/modules at a remote server may generate a fourth image using the second image, wherein the fourth image has a second scale value. The remote server may generate the fourth image using the second image. For example, the fourth image may be the second image at a different scale value, such as a scale value greater than or less than the first scale value. The fourth image may be a version of the second image. In some embodiments, multiple images may be generated using the second image, each of which may be at different scale values. In some embodiments, images with scale values both greater than and less than the default scale value may be generated, while in other embodiments, images with scale values greater than or less than the default scale value may be generated. The first text in the fourth image may be modified according to the second scale value.

At block 250 of the process flow 200, computer-executable instructions stored on a memory of a device, such as a remote server or a user device, may be executed to generate a fifth image using the third image, wherein the fifth image has the second scale value. For example, one or more multi-scaling engines/modules at a remote server may generate a fifth image using the third image, wherein the fifth image has the second scale value. The remote server may generate the fifth image using the third image. For example, the fifth image may be the third image at a different scale value, such as a scale value greater than or less than the first scale value. The fifth image may be a version of the third image. In some embodiments, multiple images may be generated using the third image, each of which may be at different scale values. In some embodiments, images with scale values both greater than and less than the default scale value may be generated, while in other embodiments, images with scale values greater than or less than the default scale value may be generated. The second text in the fifth image may be modified according to the second scale value.

At block 260 of the process flow 200, computer-executable instructions stored on a memory of a device, such as a remote server or a user device, may be executed to determine, using at least one of the second image and the fourth image, the first text. For example, the nutrition text detection engine/modules at a remote server may determine, using at least one of the second image and the fourth image, the first text. To determine the first text, the remote server may process the second image and/or the fourth image (as well as any other images generated using the second image) using one or more optical character recognition algorithms. Based at least in part on output of the optical character recognition processing, the first text may be determined. In some embodiments, the optical character recognition output may include corresponding confidence scores indicative of an accuracy of the conversion. Using the confidence scores, words or characters with the highest relative confidence scores may be determined using, in some instances, optical character recognition output from more than one image. Optical character recognition output accuracy may vary across different scale values, and overall accuracy may therefore be improved using more than one image and/or scale value.

At block 270 of the process flow 200, computer-executable instructions stored on a memory of a device, such as a remote server or a user device, may be executed to determine, using at least one of the third image and the fifth image, the second text. For example, the nutrition text detection engine/modules at a remote server may determine, using at least one of the third image and the fifth image, the second text. To determine the second text, the remote server may process the third image and/or the fifth image (as well as any other images generated using the third image) using one or more optical character recognition algorithms. Based at least in part on output of the optical character recognition processing, the second text may be determined. In some embodiments, the optical character recognition output may include corresponding confidence scores indicative of an accuracy of the conversion. Using the confidence scores, words or characters with the highest relative confidence scores may be determined using, in some instances, optical character recognition output from more than one image.

At block 280 of the process flow 200, computer-executable instructions stored on a memory of a device, such as a remote server or a user device, may be executed to cause at least a portion of the first text and the second text to be stored in association with a product identifier. For example, the nutrition text detection engine/modules at a remote server may cause at least a portion of the first text and the second text to be stored in association with a product identifier. The portion of the first text and the second text may be stored in association with a product identifier, such as a food product identifier, as structured data and/or in a database. For example, the remote server may determine that a portion of the first text corresponds to serving size information, and may determine that a portion of the second text corresponds to caloric information. The corresponding values may therefore be stored as the appropriate attributes.

Figure 3:
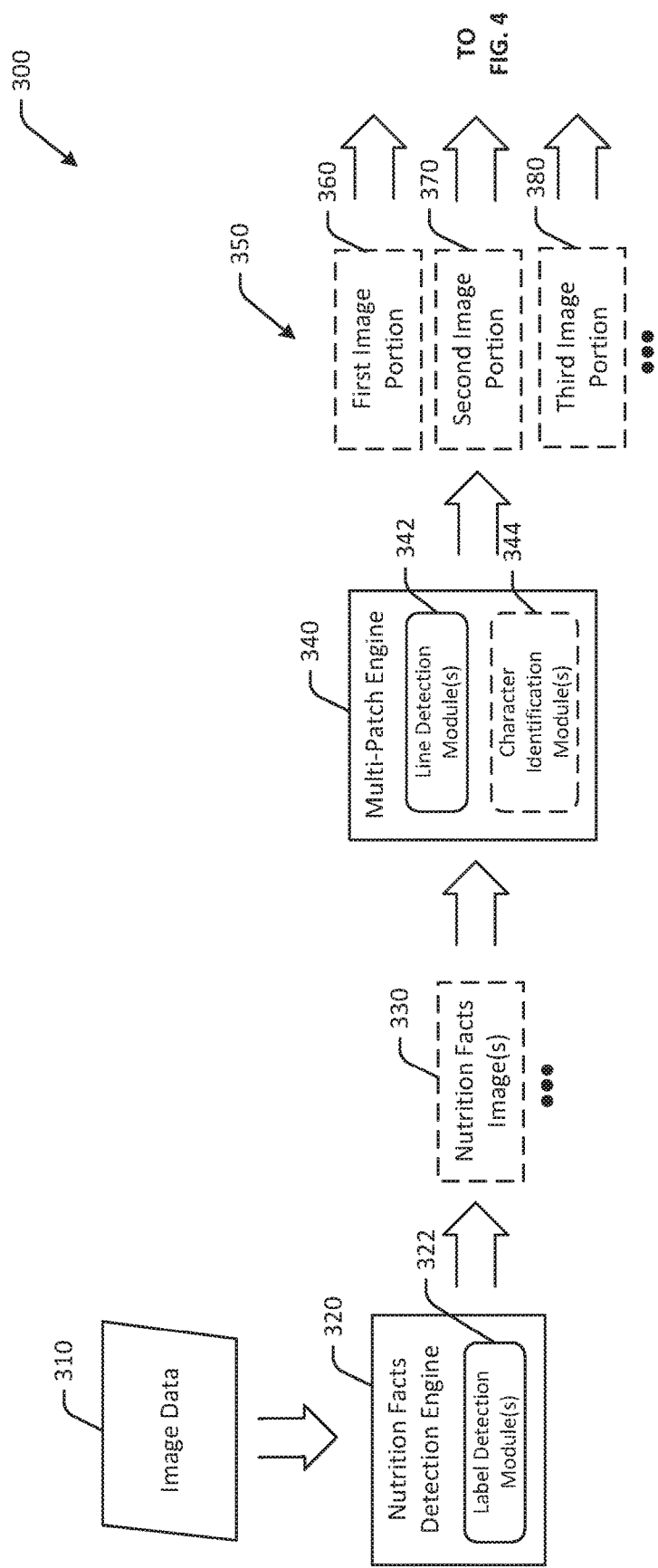
FIGS. 3-4 are schematic illustrations of example hybrid data and process flows for automated detection and extraction of nutrition information for food products in accordance with one or more example embodiments of the disclosure.
Figure 4:
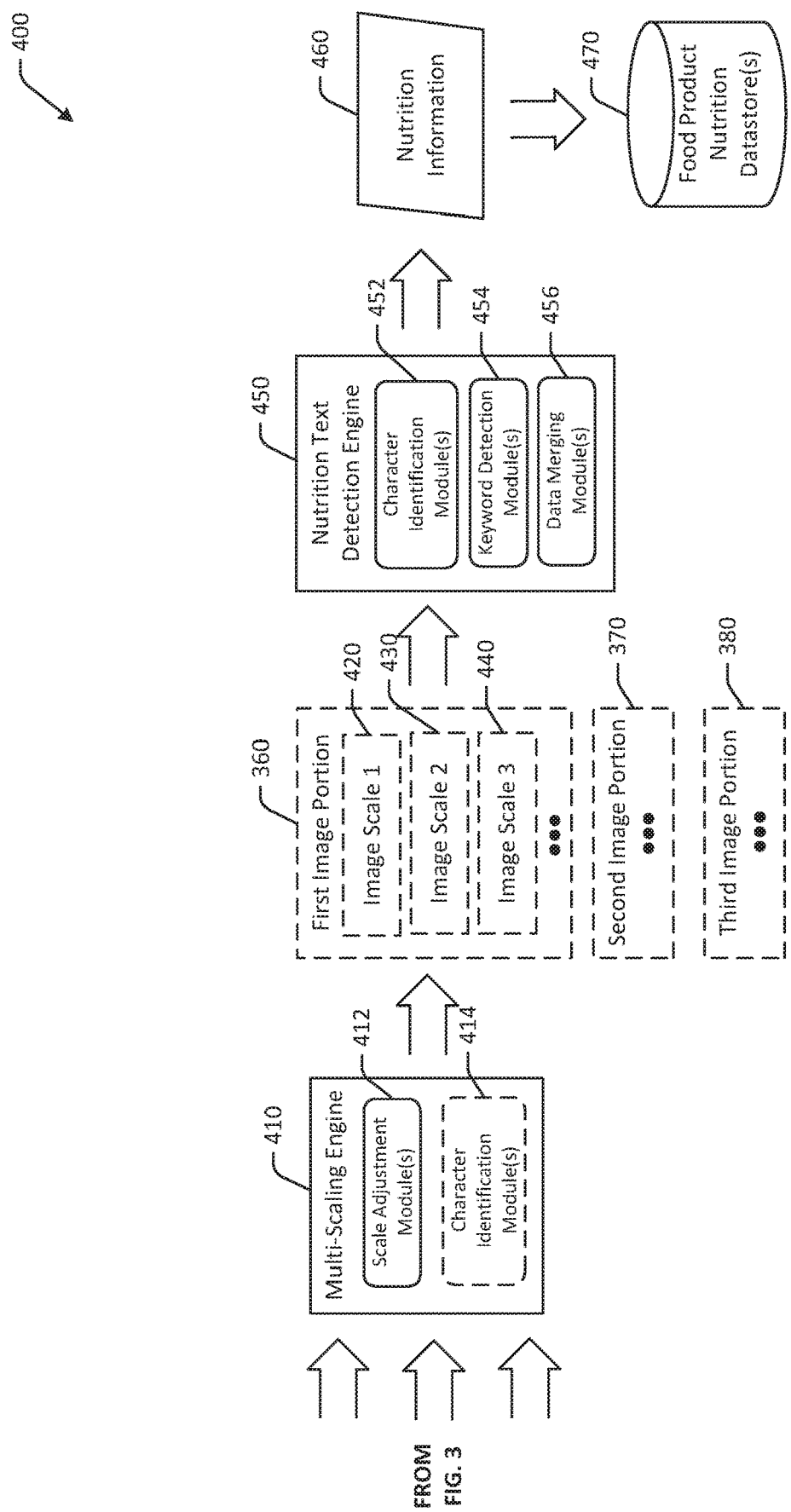

FIGS. 3-4 are schematic illustrations of example hybrid data and process flows for automated detection and extraction of nutrition information for food products in accordance with one or more example embodiments of the disclosure.

In FIG. 3, an example data and process flow 300 for an automated detection and multi-patching process is depicted in accordance with one or more example embodiments of the disclosure. Different embodiments may include different, additional, or fewer inputs or outputs than those illustrated in the example of FIG. 3.

In FIG. 3, image data 310 may be input at a nutrition facts detection engine 320. The nutrition facts detection engine 320 may be stored and/or executed by one or more remote servers or computer systems. The nutrition facts detection engine 320 may include one or more modules, such as a label detection module 322. Additional or fewer, or different, modules may be included. The nutrition facts detection engine 320 may be configured to identify images that include nutritional information, such as images that include nutrition facts labels. The nutrition facts detection engine 320 may be configured to detect portions of images that include nutrition information. For example, an image that includes a person eating a food product, where the nutrition facts for the food product may be visible on packaging of the food product, may be detected by the nutrition facts detection engine 320. In some instances, the nutrition facts detection engine 320 may include the label detection module 322, which may be configured to determine a portion of an image that corresponds to nutritional information. For example, the label detection module 322 may be configured to generate coordinates about a perimeter of a nutritional facts label that may be used to extract the nutrition facts label from the image data 310. In some embodiments, the nutrition facts detection engine 320 may process multiple images associated with a food product to identify images that contain nutritional information. In instances where no images can be found for a food product that include nutrition information, some embodiments may be configured to search for substitutable products to location images with nutritional information. Substitutable products may include the same food product in a different quantity size, for example.

The nutrition facts detection engine 320 may optionally output one or more nutrition facts images 330. For example, a set of images associated with a food product may include ten images, of which two include nutritional information. The nutrition facts detection engine 320 may identify the two images that include nutritional information and output the two images or identifiers associated with the two images as nutrition facts images 330.

The optional nutrition facts images 330, or other output from the nutrition facts detection engine 320 may be input at a multi-patch engine 340. The multi-patch engine 340 and/or one or more multi-patch module(s) may be configured to separate images into multiple patches or sections. The multi-patch engine 340 may be stored at and/or executed by one or more remote servers. The multi-patch engine 340 may include one or more modules or algorithms, such as a line detection module 342 and an optional character identification module 344. The multi-patch engine 340 may optionally be configured to process images using optical character recognition. Additional or fewer, or different, modules may be included.

The multi-patch engine 340 may determine, using the optional nutrition facts images 330, points or lines at which to separate the respective nutrition facts images. For example, the multi-patch engine 340 may implement the line detection module 342 to determine lines having a certain orientation and/or thickness that may appear in a nutrition facts image 330. The detected lines may be used to determine where to separate the nutrition facts image 330. In some embodiments, lines may have a dark color, while in other embodiments, lines may be white space and appear as vertical spacing or gaps. The multi-patch engine 340 may determine, for example, that two lines matching certain characteristics appear in a nutrition facts image 330, and may therefore determine that the nutrition facts image 330 is to be separated into three portions, demarcated by the detected lines. For example, the multi-patch engine 340 may determine that the nutrition facts label 330 is to be separated into a first image portion 360, a second image portion 370, and a third image portion 380. Any number of image portions may be output. The multi-patch engine 340 may generate images corresponding to the respective first image portion 360, second image portion 370, and third image portion 380. The first image portion 360 may be a top portion of the nutrition facts image 330, the second image portion 370 may be a middle portion of the nutrition facts image 330, and the third image portion 380 may be may be a bottom portion of the nutrition facts image 330. The respective image portions may be mutually exclusive or may have some overlap. The multi-patch engine 340 may output any suitable number of images corresponding to the portions of the nutrition facts image 330.

In some embodiments, the multi-patch engine 340 may also output optical character recognition results for the respective image portions. For example, using the character identification module(s) 344, the multi-patch engine 340 may process the first image portion 360, the second image portion 370, and the third image portion 380 to determine optical character recognition processing results. The multi-patch engine 340 may generate confidence scores associated with the optical character recognition processing results for the various images corresponding to the image portions. The confidence scores may be associated with individual characters, words, lines, images as a whole, and so forth. The output 350 from the multi-patch engine 350 may be input at one or more scaling engines, as illustrated in FIG. 4.

In FIG. 4, an example data and process flow 400 for an automated detection and multi-scaling process is depicted in accordance with one or more example embodiments of the disclosure. Different embodiments may include different, additional, or fewer inputs or outputs than those illustrated in the example of FIG. 4.

In FIG. 4, output from the multi-patch engine 350 may be input at one or more multi-scaling engines 410. For example, the first image portion 360, the second image portion 370, and the third image portion 380 may be input at the multi-scaling engine 410. The multi-scaling engine 410 may be stored and/or executed by one or more remote servers or computer systems. The multi-scaling engine 410 may include one or more modules, such as a scale adjustment module 412, one or more optional character identification modules 414, and/or other modules. Additional or fewer, or different, modules may be included. The multi-scaling engine 410 may be configured to generate different versions of images at different scale values. The multi-scaling engine 410 may therefore generate images based at least in part on baseline images, where the generated images have different scale values. For example, the multi-scaling engine 410 may execute the scale adjustment module 412 to determine a scale value at which to generate an image. The scale value may be determined based at least in part on a scale value of an input image, predefined settings, and/or other factors.

In FIG. 4, the multi-scaling engine 410 may generate, for the first image portion 360, a second image 420 of the first image portion at a first scale value, a third image 430 of the first image portion at a second scale value, a fourth image 440 of the first image portion at a third scale value, and so forth. Any number of images may be generated at any number of scale values. The content of each image may be the same, but at different scale values. The multi-scaling engine 410 may similarly generate additional images for the second image portion 370 and the third image portion 380.

In some embodiments, the multi-scaling engine 410 may also output optical character recognition results for the respective images at different scale values. For example, using the character identification module(s) 414, the multi-scaling engine 410 may process the images to determine optical character recognition processing results. The multi-scaling engine 410 may generate confidence scores associated with the optical character recognition processing results for the various images corresponding to the scale values. The confidence scores may be associated with individual characters, words, lines, images as a whole, and so forth.

Output from the multi-scaling engine 410 may be input at one or more nutrition text detection engines/modules 450. For example, the images at different scale values output by the multi-scaling engine 410 may be input at the nutrition text detection engine 450. In some embodiments, optical character recognition processing results output by the multi-scaling engine 410 may be input at the nutrition text detection engine 450. The nutrition text detection engine 450 may be configured to determine nutrition information for a food product based at least in part on the output of the multi-scaling engine 410. The nutrition text detection engine 450 may be stored and/or executed by one or more remote servers or computer systems. The nutrition text detection engine 450 may include one or more modules, such as one or more character identification modules 452, one or more keyword detection modules 454, one or more data merging modules, and/or other modules. Additional or fewer, or different, modules may be included. The nutrition text detection engine 450 may be configured to generate optical character recognition output for various images. The nutrition text detection engine 450 may determine attribute values for various nutrition categories, such as calories, protein, carbohydrates, etc. For example, the nutrition text detection engine 450 may process the images generated by the multi-scaling engine 410 to using one or more optical character recognition algorithms. The outputs may be evaluated by the nutrition text detection engine 450 to determine appropriate attributes. The nutrition text detection engine 450 may generate optical character recognition results for the respective images at different scale values. For example, using the character identification module(s) 452, the nutrition text detection engine 450 may process the images to determine optical character recognition processing results. The nutrition text detection engine 450 may generate confidence scores associated with the optical character recognition processing results for the various images corresponding to the scale values. The confidence scores may be associated with individual characters, words, lines, images as a whole, and so forth.

In some embodiments, the nutrition text detection engine 450 may be configured to determine whether certain keywords appear in optical character recognition processing results. For example, words such as "serving size," "carbohydrates," "fat," "calories," and so forth may be keywords. If the words are found in optical character recognition processing results, the nutrition text detection engine 450 may determine that the remainder of the optical character recognition processing results may likely be accurate. In some embodiments, if it is determined that optical character recognition processing results for an image do not include any keywords, or a certain keyword, the optical character recognition processing results and/or image may be discarded.

In some embodiments, the optical character recognition processing results for different images that have the same content but at different scale values may be different. For example, optical character recognition processing results for images or words at certain scale values may be more accurate than at other scale values. Accordingly, the nutrition text detection engine 450 may be configured to merge optical character recognition processing results using the data merging module 456, so as to aggregate the most accurate data, or the data with the highest confidence scores.

The nutrition text detection engine 450 may output nutrition information 460, which may be formatted in a structured data format. The nutrition information 460 may include certain attributes, such as those found in nutrition facts label, and corresponding numerical values and/or units. The nutrition information 460 may be stored at a food product nutrition datastore 470 and used to facilitate searching of food products, identification of nutritional values for certain food products, and so forth. For example, a user may interact with a voice assistant device by uttering "how many calories are in [food product x]?" A remote server may determine first voice data indicative of a user utterance at a voice interaction device, and may determine that a meaning of the first voice data is a request for nutritional information associated with the food product. The remote server may cause the voice interaction device to audibly present at least one of the serving size value, the calorie content per serving value, the protein content per serving value, and the carbohydrate content per serving value, using data stored at the food product nutrition datastore 470. The food product nutrition datastore 470 may be a standalone data structure, or may be integrated into a different datastore, such as a product catalog. In some instances, the data may be stored both as a standalone data structure, as well as integrated into a different datastore.

Figure 5:
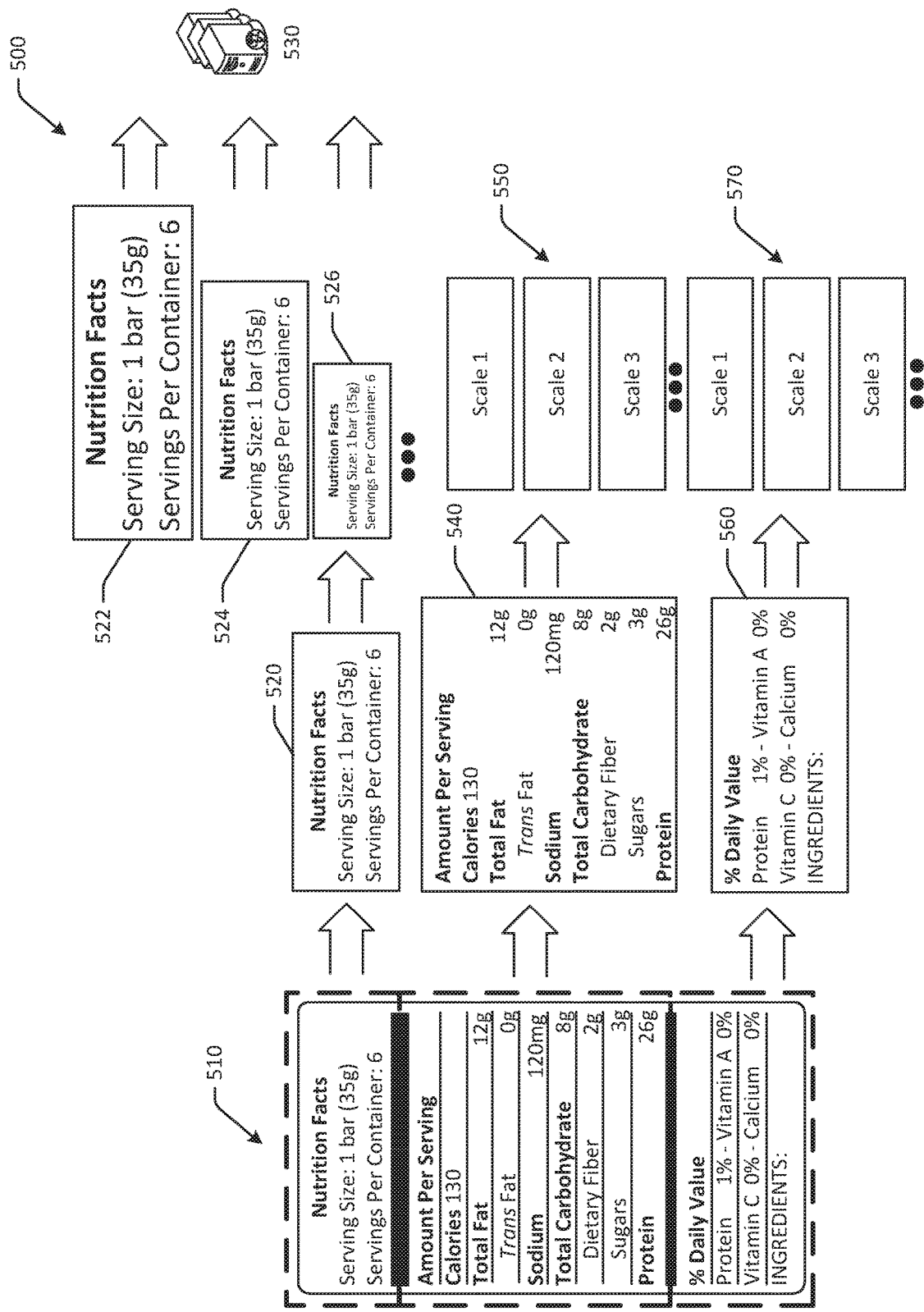
FIG. 5 is a schematic illustration of an example use case for multi-patch and multi-scale processing in accordance with one or more example embodiments of the disclosure.

FIG. 5 is a schematic illustration of an example use case 500 for multi-patch and multi-scale processing in accordance with one or more example embodiments of the disclosure. Different embodiments may include different, additional, or fewer inputs or outputs than those illustrated in the example of FIG. 5.

In FIG. 5, an image of nutritional information, such as a nutrition facts label 510, may be determined. Although illustrated in a certain format, other nutrition facts labels may have different formats, although content of nutrition facts labels may generally remain the same as far as categories of nutrition for which information is presented. For example, one or more remote servers 530 may identify an image of the nutrition facts label 510, or may extract the nutrition facts label 510 from another image. The server 530 may be any suitable remote or local computer system, such as a cloud-based computer system and may include functionality distributed across any number of computing environments and/or systems.

The nutrition facts label 510 may be separated into discrete images. For example, the server 530 may determine that the nutrition facts label 510 includes two horizontal lines that have a certain thickness, and that the nutrition facts label 510 is to therefore be separated along the respective lines. To detect the lines, the server 530 may use a line detection algorithm to determine that a horizontal line is present between a first portion and a second portion of the nutrition facts label 510. For example, the server 530 may determine, using a line detection algorithm, a first horizontal line having a first thickness in the first image of the nutrition facts label 510, and may determine, using the line detection algorithm, a second horizontal line having the first thickness in the first image of the nutrition facts label 510. The server 530 may therefore determine that the first image of the nutrition facts label 510 is to be separated into three discrete images at the first horizontal line and the second horizontal line. In the example of FIG. 5, the first horizontal line may be between the top portion and the middle portion of the nutrition facts label 510, and the second horizontal line may be between the middle portion and the bottom portion of the nutrition facts label 510.

In other embodiments, the server 530 may determine that a vertical spacing between a first line of text and a second line of text in the first image satisfies a separation threshold, instead of using a line detection algorithm. The server 530 may therefore determine that the first portion of the first image of the nutrition facts label 510 is on a first side of the vertical spacing, and that the second portion of the first image of the nutrition facts label 510 is on a second side of the vertical spacing.

To separate the nutrition facts label 510 into discrete images, the server 530 may generate a second image 520 that includes a first portion of the first image 510, where the second image has a first scale value and includes first text. The server 530 may generate a third image 540 that includes a second portion of the first image 510, where the third image has a first scale value and includes second text. The server 530 may generate a fourth image 560 that includes a third portion of the first image 510, where the fourth image has a first scale value and includes third text. In some embodiments, the first portion, the second portion, and the third portion of the first image 510 may not overlap, such that the first text is different than the second text and the third text.

The server 530 may generate additional images at different scale values. For example, for the second image 520, the remote server may generate a fifth image 522 that includes the first text, but has a second scale value that is greater than the first scale value, a sixth image 524 that includes the first text, but has a third scale value that is less than the second scale vale, a seventh image 526 that includes the first text, but has a fourth scale value that is less than the first scale value, and so forth. Any number of images at any different scale values may be generated. The server 530 may similarly generate a number of images 550 at different scale values based on the third image 540, and a number of images 570 at different scale values based on the fourth image 570.

The server 530 may process the scaled images, as well as the original images of the portions of the nutrition facts label 510, using one or more optical character recognition algorithms. Output may be used to determine nutritional attributes and values for a food product, and may be stored in association with food product identifiers.

Figure 6:
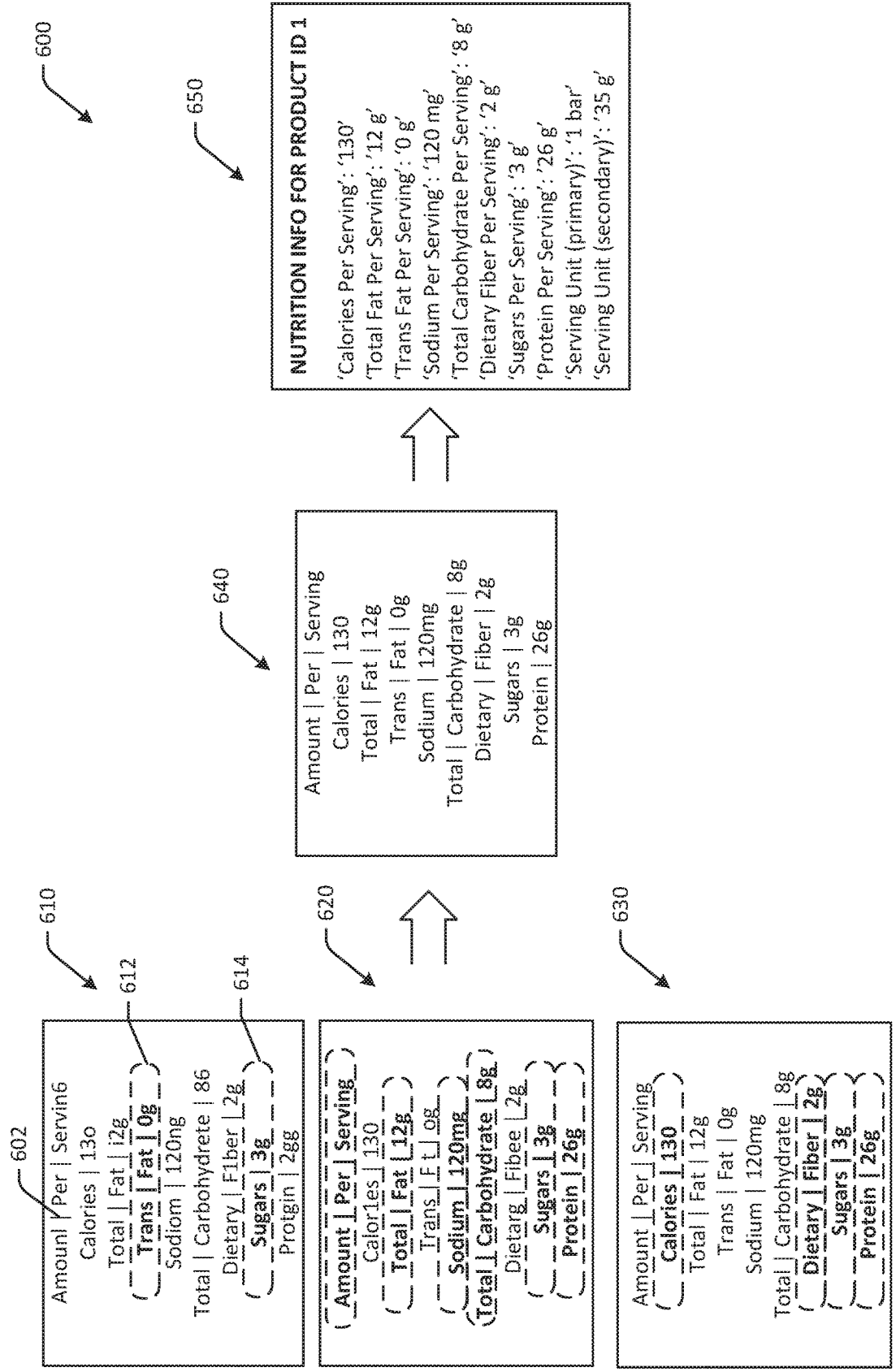
FIG. 6 is a schematic illustration of an example use case for extracted character merging in accordance with one or more example embodiments of the disclosure.

FIG. 6 is a schematic illustration of an example use case 600 for extracted character merging in accordance with one or more example embodiments of the disclosure. Different embodiments may include different, additional, or fewer inputs or outputs than those illustrated in the example of FIG. 6.

In the example of FIG. 6, first optical character recognition processing output 610 for a first image may be determined by one or more remote servers. The first optical character recognition processing output 610 may be for a first image at a first scale value. A second image may include the same content as the first image, but may be at a second scale value. Second optical character recognition processing output 620 for the second image may be determined. Third optical character recognition processing output 630 may be associated with a third image that has the same content as the first image and the second image, but has a third scale value that is different than the first scale value and the second scale value. In FIG. 6, vertical lines 602 are illustrated only to facilitate understanding of breaks between words in the optical character recognition processing output, and are not intended to appear as part of the optical character recognition processing output.

The optical character recognition processing outputs 610, 620, 630 for the respective first, second, and third images may vary. For example, the optical character recognition processing outputs may not be uniform as a result of variance in confidence scores and/or optical character recognition algorithm output. For example, in the first optical character recognition processing output 610, a first line of text may be determined to include the words "amoun1," "per," "servin6." However, in the second optical character recognition processing output 620, the first line may be determined to include the words "amount," "per," "serving."

The optical character recognition processing output may include confidence scores that indicate a likelihood of accuracy of the detected characters, words, and/or overall text in the image. The confidence scores may be used by the remote server to determine which optical character recognition processing output or portions of optical character recognition processing output to include as nutritional information. For example, the remote server may determine that a first optical character recognition confidence score associated with optical character recognition processing of the first image is greater than a second optical character recognition processing confidence score associated with processing of the second image. The remote server may determine an average or aggregate confidence score for an image that can be used to compare optical character recognition processing output for different images. The remote server may determine that a third optical character recognition confidence score associated with optical character recognition processing of the third image is greater than the first and second optical character recognition confidence scores. As a result, the output associated with the third image may be determined to be most accurate in one example.

The remote server may detect the presence of keywords to determine whether optical character recognition processing output is accurate. For example, the remote server may determine that first text includes a first nutritional term or keyword, such as predefined terms include amount, calories, sodium, protein, etc. If the term is present, the remote server may determine a first numerical value adjacent to the first nutritional term, such as "26" "g" of protein, where the first numerical value can be stored in associated with the first nutritional term as nutritional data for the food product. If the first numerical value associated with the first nutritional term in the optical character recognition output is indeterminate (e.g., not a number, unclear, low confidence score, etc.), the remote server may determine the first numerical value using optical character recognition processing output for a different image.

The remote server may therefore merge or aggregate portions of optical character recognition processing output to determine nutritional data. For example, the remote server may generate aggregated nutritional data 640 that includes portions of the first, second, and third optical character recognition processing output 610, 620, 630.

The aggregated nutritional data 640 may include, for example, a first line from the second optical character recognition processing output 620 (as illustrated using dashed lines in FIG. 6), a second line from the third optical character recognition processing output 630, a third line from the second optical character recognition processing output 620, a fourth line 612 from the first optical character recognition processing output 610, a fifth line and sixth line from the second optical character recognition processing output 620, and a seventh line, eighth line, and ninth line from the third optical character recognition processing output 630. The eighth line 614 may be determined from the first optical character recognition processing output 610, the second optical character recognition processing output, or the third optical character recognition processing output 630, as the eighth line may be corrected determined in each image.

As a result, the aggregated nutritional data 640 may include data corresponding to the highest confidence scores. Although illustrated in the context of lines, in some embodiments, portions of lines, such as characters or words, may be extracted from different optical character recognition processing outputs.

The aggregated nutritional data 640 may be stored as structured data 650, with various nutritional attributes associated with corresponding values. For example, calories per serving, total fat per serving, and so forth may be stored in association with the product identifier. For example, the structured data 650 may include: "'Calories Per Serving': '130'; 'Total Fat Per Serving': '12'; 'Trans Fat Per Serving': '0'; 'Sodium Per Serving': '120'; 'Total Carbohydrate Per Serving': '8'; 'Dietary Fiber Per Serving': '2'; 'Sugars Per Serving': '3'; 'Protein Per Serving': '26'; 'Serving Unit (primary)': 'g'; 'Serving Unit (secondary)': 'bar'." In some embodiments, serving units may be integrated with attributes. For example, calories may be stored as "'Calories Per Serving': '130 kcal'," fat may be stored as "'Total Fat Per Serving': '12 g'," and so forth. The structured data 650 may be used to provide searching, filtering, and additional functionality of nutritional data for food products.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 7:
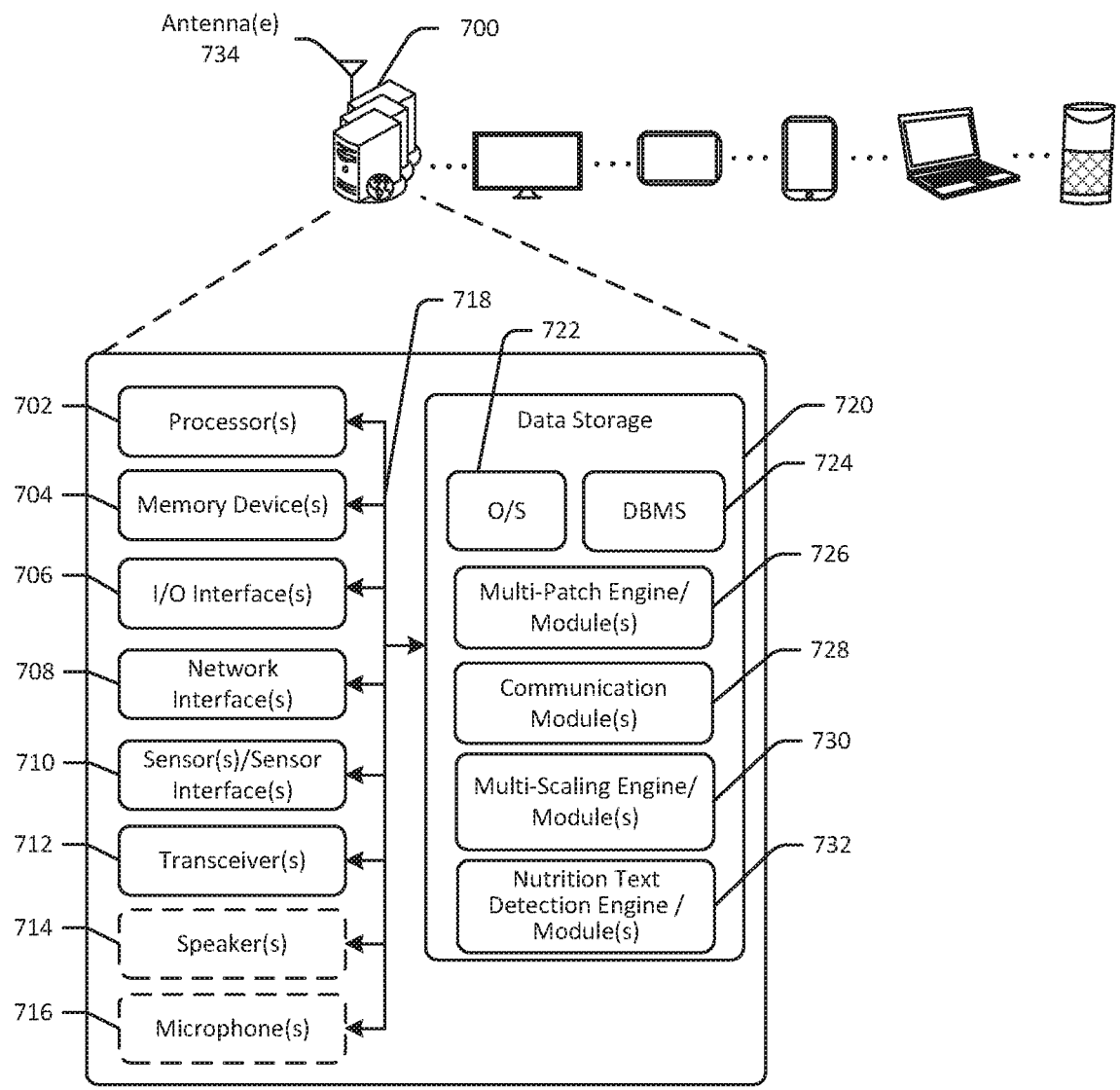
FIG. 7 is a schematic block diagram of an illustrative device in accordance with one or more example embodiments of the disclosure.

FIG. 7 is a schematic block diagram of an illustrative remote server 700 in accordance with one or more example embodiments of the disclosure. The remote server 700 may include any suitable computing device capable of receiving and/or sending data including, but not limited to, a mobile device such as a smartphone, tablet, e-reader, wearable device, or the like; a desktop computer; a laptop computer; a content streaming device; a set-top box; or the like. The remote server 700 may correspond to an illustrative device configuration for the devices of FIGS. 1-6.

The remote server 700 may be configured to communicate via one or more networks with one or more servers, search engines, user devices, or the like. In some embodiments, a single remote server or single group of remote servers may be configured to perform more than one type of nutrition information detection and filtering.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 700 may include one or more processors (processor(s)) 702, one or more memory devices 704 (generically referred to herein as memory 704), one or more input/output (I/O) interface(s) 706, one or more network interface(s) 708, one or more sensors or sensor interface(s) 710, one or more transceivers 712, one or more optional speakers 714, one or more optional microphones 716, and data storage 720. The remote server 700 may further include one or more buses 718 that functionally couple various components of the remote server 700. The remote server 700 may further include one or more antenna(e) 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit exchange of information (e.g., data (including computer-executable code), signaling, etc.) between various components of the remote server 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the remote server 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like such as, for example, one or more multi-patch engine/module(s) 726, one or more communication module(s) 728, one or more multi-scaling engine/module(s) 730, and/or one or more nutrition text detection engine/module(s) 732. Some or all of these module(s) may be sub-module(s). Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support functionality described in reference to correspondingly named components earlier in this disclosure.

The data storage 720 may further store various types of data utilized by components of the remote server 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, the datastore(s) may include, for example, user preference information, user profile information, search history information, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the remote server 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the multi-patch engine/module(s) 726 may include computer-executable instructions, code, or the like that responsive to execution by one or more of the processor(s) 702 may perform functions including, but not limited to, detecting spaces between lines of text, detecting gaps, such as vertical gaps, between text characters, detecting lines having certain thicknesses, generating images or sub-images, extracting portions of images, processing images using character recognition algorithms, and the like.

The communication module(s) 728 may include computer-executable instructions, code, or the like that responsive to execution by one or more of the processor(s) 702 may perform functions including, but not limited to, communicating with one or more devices, for example, via wired or wireless communication, communicating with remote servers, communicating with remote datastores, sending or receiving notifications or commands/directives, communicating with cache memory data, communicating with user devices, and the like.

The multi-scaling engine/module(s) 730 may include computer-executable instructions, code, or the like that responsive to execution by one or more of the processor(s) 702 may perform functions including, but not limited to, analyzing digital content, extracting text, generating images with different scale values, processing images using character recognition algorithms, determining whether a keyword is present in text, determining scale values to use for image generation, and the like.

The nutrition text detection engine/module(s) 732 may include computer-executable instructions, code, or the like that responsive to execution by one or more of the processor(s) 702 may perform functions including, but not limited to, processing images using character recognition algorithms, determining presence of a keyword, determining search results, associating data with food product identifiers, generating nutritional information, and the like.

Referring now to other illustrative components depicted as being stored in the data storage 720, the O/S 722 may be loaded from the data storage 720 into the memory 704 and may provide an interface between other application software executing on the remote server 700 and hardware resources of the remote server 700. More specifically, the O/S 722 may include a set of computer-executable instructions for managing hardware resources of the remote server 700 and for providing common services to other application programs (e.g., managing memory allocation among various application programs). In certain example embodiments, the O/S 722 may control execution of the other program module(s) to for content rendering. The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 700 is a mobile device, the DBMS 724 may be any suitable light-weight DBMS optimized for performance on a mobile device.

Referring now to other illustrative components of the remote server 700, the input/output (I/O) interface(s) 706 may facilitate the receipt of input information by the remote server 700 from one or more I/O devices as well as the output of information from the remote server 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(e) 734 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 700 may further include one or more network interface(s) 708 via which the remote server 700 may communicate with any of a variety of other systems, platforms, networks, devices, and so forth. The network interface(s) 708 may enable communication, for example, with one or more wireless routers, one or more host servers, one or more web servers, and the like via one or more of networks.

The antenna(e) 734 may include any suitable type of antenna depending, for example, on the communications protocols used to transmit or receive signals via the antenna (e) 734. Non-limiting examples of suitable antennas may include directional antennas, non-directional antennas, dipole antennas, folded dipole antennas, patch antennas, multiple-input multiple-output (MIMO) antennas, or the like. The antenna(e) 734 may be communicatively coupled to one or more transceivers 712 or radio components to which or from which signals may be transmitted or received.

As previously described, the antenna(e) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 734 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 734 may be configured to transmit or receive radio frequency signals within any suitable frequency range forming part of the unlicensed portion of the radio spectrum.

The antenna(e) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(e) 734—transmitting or receiving radio frequency (RF) signals in the bandwidth and/or channels corresponding to the communications protocols utilized by the remote server 700 to communicate with other devices. The transceiver(s) 712 may include hardware, software, and/or firmware for modulating, transmitting, or receiving—potentially in cooperation with any of antenna(e) 734—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the remote server 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 714 may be any device configured to generate audible sound. The optional microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the remote server 700 may include alternate and/or additional hardware, software, or firmware components beyond those described or depicted without departing from the scope of the disclosure. More particularly, it should be appreciated that software, firmware, or hardware components depicted as forming part of the remote server 700 are merely illustrative and that some components may not be present or additional components may be provided in various embodiments. While various illustrative program module(s) have been depicted and described as software module(s) stored in data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
    identifying, by one or more computer processors coupled to memory, at least a first image comprising nutritional data;
    generating a second image comprising a first portion of the first image, wherein the second image has a first scale value and comprises first text;
    generating a third image comprising a second portion of the first image, wherein the third image has the first scale value and comprises second text;
    generating a fourth image using the second image, wherein the fourth image has a second scale value;
    generating a fifth image using the third image, wherein the fifth image has the second scale value;
    determining that a first optical character recognition confidence score associated with optical character recognition processing of the fourth image is greater than a second optical character recognition confidence score associated with optical character recognition processing of the second image;
    determining, using at least one of the second image and the fourth image, the first text;
    determining that a third optical character recognition confidence score associated with optical character recognition processing of the fifth image is greater than a fourth optical character recognition confidence score associated with optical character recognition processing of the third image;
    determining, using at least one of the third image and the fifth image, the second text; and
    causing at least a portion of the first text and a portion of the second text to be stored in association with a product identifier.

2. The method of claim 1, further comprising:
    determining a set of images of a food product associated with the product identifier, the set of images comprising a sixth image;
    determining that the sixth image comprises the nutritional data;
    determining a portion of the sixth image that comprises the nutritional data; and
    generating the first image using the portion of the sixth image.

3. The method of claim 1, further comprising:
    determining that a vertical spacing between a first line of text and a second line of text in the first image satisfies a separation threshold;
    determining that the first portion of the first image is on a first side of the vertical spacing; and
    determining that the second portion of the first image is on a second side of the vertical spacing.

4. The method of claim 1, further comprising:
    determining that a horizontal line is present between the first portion and the second portion.

5. The method of claim 1, wherein the second scale value is greater than the first scale value, the method further comprising:
    generating a sixth image using the second image, wherein the sixth image has a third scale value that is less than the first scale value; and
    generating a seventh image using the third image, wherein the seventh image has the third scale value.

6. The method of claim 1, further comprising:
determining first optical character recognition output for the fourth image;
determining that a first nutritional term is present in the first optical character recognition output;
determining second optical character recognition output for the fifth image; and
determining that a second nutritional term is present in the second optical character recognition output.

7. The method of claim 6, further comprising:
determining that a first numerical value associated with the first nutritional term in the first optical character recognition output is indeterminate;
determining third optical character recognition output for the second image;
determining that the first numerical value is determined in the third optical character recognition output; and
associating the first numerical value with the first nutritional term.

8. The method of claim 1, further comprising:
determining that the first text comprises a first nutritional term; and
determining a first numerical value adjacent to the first nutritional term, wherein the first numerical value is stored in associated with the first nutritional term as the nutritional data.

9. The method of claim 1, wherein the first portion of the first image and the second portion of the first image at least partially overlap.

10. The method of claim 1, further comprising:
generating a sixth image comprising a third portion of the first image, wherein the sixth image has the first scale value and comprises third text;
determining that the third portion of the first image does not comprise a keyword; and
discarding the sixth image;
wherein the first portion, the second portion, and the third portion of the first image do not overlap.

11. The method of claim 1, further comprising:
determining first voice data indicative of a user utterance at a voice interaction device;
determining that a meaning of the first voice data is a request for the nutritional data; and
causing the voice interaction device to audibly present the at least the portion of the first text and the portion of the second text.

12. A system comprising:
memory configured to store computer-executable instructions; and
at least one computer processor configured to access the memory and execute the computer-executable instructions to:
  identify at least a first image comprising nutritional data;
  generate a plurality of images, each image of the plurality of images comprising a portion of the first image at a different scale value, wherein the plurality of images comprises a second image having a second scale value that is greater than a first scale value of the first image, and a third image having a third scale value that is less than the first scale value;
  determine a respective optical character recognition confidence score associated with optical character recognition processing of each individual image of the plurality of images;
  determine at least one image of the plurality of images associated with an optical character recognition confidence score that is greater than a threshold;
  determine, using the at least one image, first text representing a portion of the nutritional data of the first image; and
  cause at least a portion of the first text to be stored in association with a product identifier.

13. The system of claim 12, wherein the at least one processor is further configured to access the memory and execute the computer-executable instructions to:
determine a set of images of a food product associated with the product identifier, the set of images comprising a second image;
determine that the second image comprises the nutritional data;
determine a portion of the second image that comprises the nutritional data; and
generate the first image using the portion of the second image.

14. The system of claim 12, wherein the at least one processor is further configured to access the memory and execute the computer-executable instructions to:
determine that a vertical spacing between a first line of text and a second line of text in the first image satisfies a separation threshold;
determine that the first portion of the first image is on a first side of the vertical spacing; and
determine that the second portion of the first image is on a second side of the vertical spacing.

15. A method comprising:
identifying, by one or more computer processors coupled to memory, at least a first image comprising nutritional data;
determining that a vertical spacing between a first line of text and a second line of text in the first image satisfies a separation threshold;
determining that a first portion of the first image is on a first side of the vertical spacing;
determining that a second portion of the first image is on a second side of the vertical spacing;
generating a second image comprising the first portion of the first image, wherein the second image has a first scale value and comprises first text;
generating a third image comprising the second portion of the first image, wherein the third image has the first scale value and comprises second text;
generating a fourth image using the second image, wherein the fourth image has a second scale value;
generating a fifth image using the third image, wherein the fifth image has the second scale value;
determining, using at least one of the second image and the fourth image, the first text;
determining, using at least one of the third image and the fifth image, the second text; and
causing at least a portion of the first text and a portion of the second text to be stored in association with a product identifier.

16. The method of claim 15, further comprising:
determining a set of images of a food product associated with the product identifier, the set of images comprising a sixth image;
determining that the sixth image comprises the nutritional data;
determining a portion of the sixth image that comprises the nutritional data; and generating the first image using the portion of the sixth image.

17. The method of claim 15, further comprising:

determining first optical character recognition output for the fourth image;

determining that a first nutritional term is present in the first optical character recognition output;

determining second optical character recognition output for the fifth image; and determining that a second nutritional term is present in the second optical character recognition output.

18. The method of claim 17, further comprising:

determining that a first numerical value associated with the first nutritional term in the first optical character recognition output is indeterminate;

determining third optical character recognition output for the second image;

determining that the first numerical value is determined in the third optical character recognition output; and associating the first numerical value with the first nutritional term.

19. The method of claim 15, further comprising:

determining that the first text comprises a first nutritional term; and determining a first numerical value adjacent to the first nutritional term, wherein the first numerical value is stored in associated with the first nutritional term as the nutritional data.

20. The method of claim 15, wherein the first portion of the first image and the second portion of the first image at least partially overlap.

\* \* \* \* \*